(12) United States Patent
Bobbitt et al.

(10) Patent No.: US 8,253,831 B2
(45) Date of Patent: Aug. 28, 2012

(54) LOCATION-AWARE EVENT DETECTION

(75) Inventors: Russell Patrick Bobbitt, Pleasantville, NY (US); Quanfu Fan, Somerville, MA (US); Arun Hampapur, Norwalk, CT (US); Frederik Kjeldsen, Poughkeepsie, NY (US); Sharathchandra Umapathirao Pankanti, Darien, CT (US); Akira Yanagawa, New York, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 12/325,178

(22) Filed: Nov. 29, 2008

(65) Prior Publication Data

US 2010/0134625 A1    Jun. 3, 2010

(51) Int. Cl.
*H04N 9/083* (2006.01)
(52) U.S. Cl. ........................ 348/274; 348/150
(58) Field of Classification Search ........... 375/240.01–240.29; 348/36–39, 348/42–60, 150, 157, 159, 169, 274
See application file for complete search history.

(56) References Cited

U.S. PATENT DOCUMENTS

| | | | |
|---|---|---|---|
| 5,745,036 A | 4/1998 | Clare | |
| 6,236,736 B1 * | 5/2001 | Crabtree et al. | 382/103 |
| 6,636,635 B2 * | 10/2003 | Matsugu | 382/218 |
| 7,004,382 B2 | 2/2006 | Sandru | |
| 7,080,778 B1 | 7/2006 | Kressin et al. | |
| 7,100,824 B2 | 9/2006 | Ostrowski et al. | |
| 7,246,745 B2 | 7/2007 | Hudnut et al. | |
| 7,319,479 B1 * | 1/2008 | Crabtree et al. | 348/169 |
| 7,448,542 B1 * | 11/2008 | Bobbitt et al. | 235/383 |
| 7,503,490 B1 * | 3/2009 | Bobbitt et al. | 235/383 |
| 7,631,808 B2 | 12/2009 | Kundu et al. | |
| 7,646,745 B2 | 1/2010 | Caldwell et al. | |
| 7,688,349 B2 * | 3/2010 | Flickner et al. | 348/150 |
| 7,822,252 B2 * | 10/2010 | Bi et al. | 382/130 |
| 7,957,565 B1 | 6/2011 | Sharma et al. | |
| 2002/0044691 A1 * | 4/2002 | Matsugu | 382/218 |
| 2003/0107649 A1 * | 6/2003 | Flickner et al. | 348/150 |
| 2003/0174869 A1 * | 9/2003 | Suarez | 382/118 |

(Continued)

FOREIGN PATENT DOCUMENTS

WO    WO/02/45434    6/2002

(Continued)

OTHER PUBLICATIONS

Moeslund, et al., "A survey of advances in vision-based human motion capture and analysis," Computer Vision and Image Understanding, pp. 90-126, 2006.

(Continued)

*Primary Examiner* — Ario Etienne
*Assistant Examiner* — Sargon Nano
(74) *Attorney, Agent, or Firm* — Ryan, Mason & Lewis, LLP

(57) ABSTRACT

Techniques for detecting one or more events are provided. The techniques include using one or more regions of interest on a video sequence to cover a location for one or more events, wherein each event is associated with at least one of the one or more regions of interest, applying multiple-instance learning to the video sequence to construct one or more location-aware event models, and applying the models to the video sequence to determine the one or more regions of interest that are associated with the one or more events.

19 Claims, 4 Drawing Sheets

U.S. PATENT DOCUMENTS

| | | | |
|---|---|---|---|
| 2004/0066966 A1* | 4/2004 | Schneiderman | 382/159 |
| 2004/0066970 A1* | 4/2004 | Matsugu | 382/217 |
| 2005/0141765 A1* | 6/2005 | Liang et al. | 382/181 |
| 2005/0265582 A1 | 12/2005 | Buehler et al. | |
| 2006/0104479 A1* | 5/2006 | Bonch-Osmolovskiy et al. | 382/103 |
| 2006/0243798 A1 | 11/2006 | Kundu et al. | |
| 2006/0251324 A1* | 11/2006 | Bachmann et al. | 382/173 |
| 2008/0006698 A1 | 1/2008 | Kotlarsky et al. | |
| 2009/0222354 A1 | 9/2009 | Murphy et al. | |
| 2009/0290802 A1* | 11/2009 | Hua et al. | 382/225 |

FOREIGN PATENT DOCUMENTS

| | | |
|---|---|---|
| WO | WO/03/045070 | 5/2003 |
| WO | WO/2006/105376 | 10/2006 |

OTHER PUBLICATIONS

Bobick, et al., "The recognition of human movement using temporal templates," IEEE PAMI, vol. 23, pp. 257-267, 2001.

Efros, et al., "Recognizing action at a distance," in ICCV03, 2003, pp. 726-733.

Urtasun, et al., "Priors for people tracking from small training sets," in ICCV05, 2005, pp. 403-410.

Shi, et al., "Propagation networks for recognition of partially ordered sequential action," in CVPR04, 2004, pp. 862-869.

Laxton, et al., "Leveraging temporal, contextual and ordering constraingt for recognizing complex activities," in CVPR07, 2007.

Laptev, et al., "Space-time interest points," in ICCV, 2003, pp. 432-439.

Ke, et al., "Efficient visual event detection using volumetric features," in ICCV05, 2005.

Dollar, et al., "Behavior recognition via sparse spatio-temporal features," in Visual Surveillance and Performance Evaluation of Tracking and Surveillance, 2005. 2nd joint IEEE International Workshop on, 2005, pp. 65-72.

D. G. Lowe, "Distinctive image features from scale-invariant keypoints," IJCV04, vol. 60, pp. 91-110, 2004.

Filipovych, et al., "Recognizing primitive interactions by exploring actor-object states," in CVPR08, 2008.

Marszalek, et al., "Learning realistic human actions from movies," in CVPR08, 2008.

Duong, et al., "Activity recognition and abnormality detection with the switching hidden semi-markov model," in CVPR05, 2005, pp. 1709-1718.

Ryoo, et. al., "Recognition of composite human activities through context-free grammar based representation," in CVPR, 2006, pp. 1709-1718.

Andrews, et al., "Multiple instance learning with generalized support vector machines," Artificial Intelligence, pp. 943-944, 2002.

\* cited by examiner

LOCATION-AWARE EVENT DETECTION

CROSS-REFERENCE TO RELATED APPLICATIONS

The present application is related to U.S. patent application entitled "Analyzing Repetitive Sequential Events," identified by Ser. No. 12/325,176, and filed concurrently herewith, the disclosure of which is incorporated by reference herein in its entirety.

Additionally, the present application is related to U.S. patent application entitled "Detecting Primitive Events at Checkout," identified by Ser. No. 12/325/177 and filed concurrently herewith, the disclosure of which is incorporated by reference herein in its entirety.

The present application is related to U.S. patent application entitled "Automatically Calibrating Regions of Interest for Video Surveillance," identified by application Ser. No. 12/262,446, and filed on Oct. 31, 2008, the disclosure of which is incorporated by reference herein in its entirety.

Also, the present application is related to U.S. patent application entitled "Generating an Alert Based on Absence of a Given Person in a Transaction," identified by application Ser. No. 12/262,454, and filed on Oct. 31, 2008, the disclosure of which is incorporated by reference herein in its entirety.

The present application is related to U.S. patent application entitled "Using Detailed Process Information at a Point of Sale," identified by Ser. No. 12/262,458, and filed on Oct. 31, 2008, the disclosure of which is incorporated by reference herein in its entirety.

Additionally, the present application is related to U.S. patent application entitled "Creating a Training Tool," identified by Ser. No. 12/262,467, and filed on Oct. 31, 2008, the disclosure of which is incorporated by reference herein in its entirety.

FIELD OF THE INVENTION

Embodiments of the invention generally relate to information technology, and, more particularly, to retail loss prevention.

BACKGROUND OF THE INVENTION

Event detection is critical to any video analytics surveillance systems. Events are often location-dependent, and knowing where an event occurs is as important as knowing when it occurs. For example, during checkouts at a grocery store, the cashier repeatedly picks up items from the lead-in belt (pickup), scans them by a scanner for purchase (scan), and places them onto the take-away belt area (drop). The pickup-scan-drop sequences are repetitive, but the locations of pickup and drop operations can vary each time. This un-oriented interaction between the cashier's hand(s) and the belt area poses a problem for learning event models where features need to be extracted from some known location.

A large portion of event models are built to detect events at a pre-specified region of interest (ROI). However, one problem may arise in some scenarios when it comes to defining an appropriate ROI for the model. In the retail example mentioned above, the cashier may pick up (or place) products anywhere in the transaction area. An overly large ROI would include many irrelevant features from bagging activity and customer interventions, while an overly small region would miss many products that are presented outside of the region. In such an instance, one could use a sliding window to exhaustively test every possible location, but such an approach is extremely inefficient and normally requires a non-trivial post-process to merge similar detected results that are nearby.

SUMMARY OF THE INVENTION

Principles and embodiments of the invention provide techniques for location-aware event detection. An exemplary method (which may be computer-implemented) for detecting one or more events, according to one aspect of the invention, can include steps of using one or more regions of interest on a video sequence to cover a location for one or more events, wherein each event is associated with at least one of the one or more regions of interest, applying multiple-instance learning to the video sequence to construct one or more location-aware event models, and applying the models to the video sequence to determine the one or more regions of interest that are associated with the one or more events.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include location-aware event detection via multiple-instance learning. One or more embodiments of the invention include using multiple regions of interest (ROIs) (also called sensors here) on a video sequence to cover all possible locations for events such that each event can be associated with at least one ROI (or sensor).

Also, one can use motion-based segmentation techniques to identify candidates for one or more events at one or more ROIs.

Further, one can also apply the multiple-instance learning techniques to the video sequence to select one or more appropriate sensors for building location-aware event detection models. Also, one can apply the models to determine and/or detect the events as well as the associated regions of interest. Further, the techniques described herein are efficient, easy to implement, as well as flexible and applicable to many learning paradigms and event detection techniques.

Multiple-instance learning (MIL) is a variation of supervised learning, where the task is to learn a concept (or model) from a set of incompletely labeled data. The training data can include a set of positive and negative bags of instances (for example, feature vectors). In a positive bag, there is at least one instance (positive) associated with the concept to be learned, but they are not known. In a negative bag, all instances are negative, that is, irrelevant to the concept. By way of example, MIL algorithms include Diverse Density (DD), Expectation-Maximization DD (EM-DD), support vector machine-multiple instance learning (SVM-MIL) and citation-k-nearest neighbor (kNN).

Figure 1:
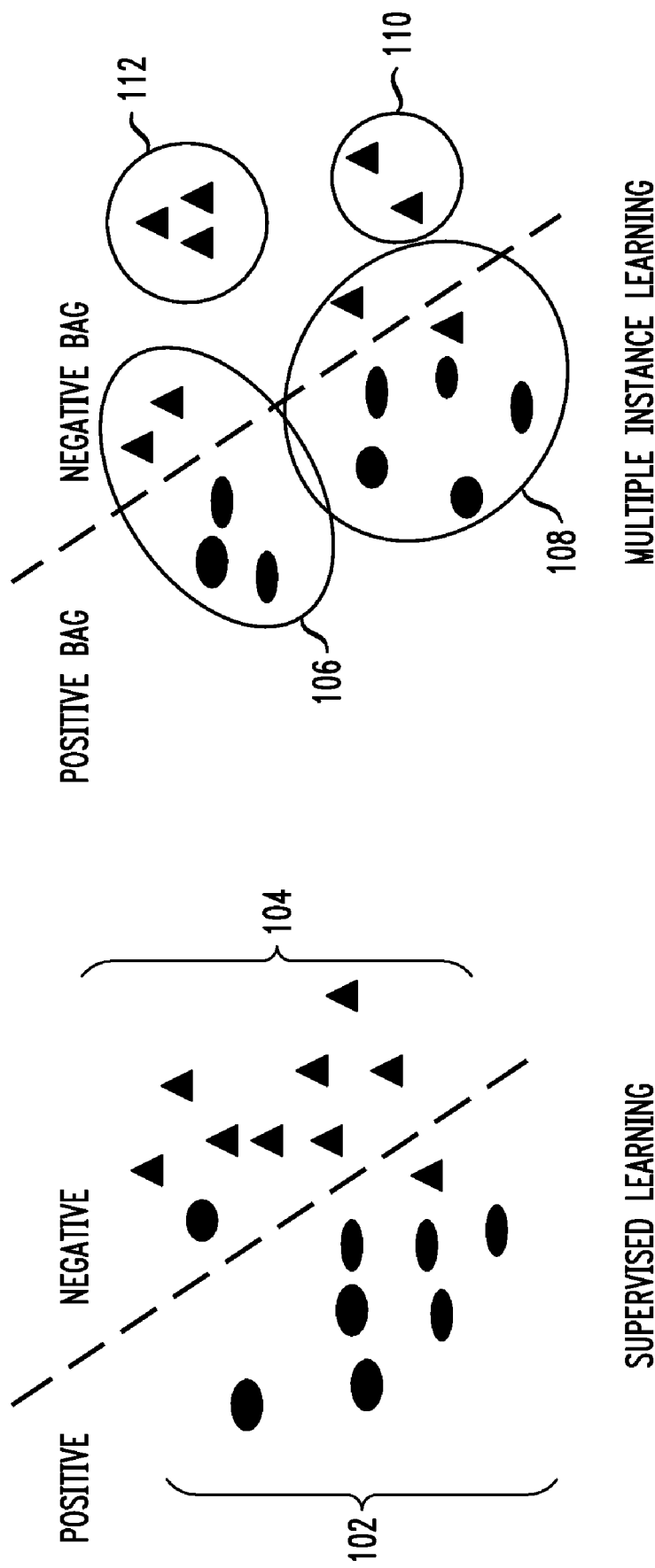
FIG. 1 is a diagram illustrating exemplary supervised learning and multiple-instance learning (MIL), according to an embodiment of the present invention.

FIG. 1 is a diagram illustrating exemplary supervised learning and multiple-instance learning (MIL), according to an embodiment of the present invention. By way of illustration, FIG. 1 depicts exemplary supervised learning which includes positive elements 102 and negative elements 104. FIG. 1 also depicts exemplary MIL which includes positive bags 106, 108, and negative bags 110 and 112.

As detailed herein, one or more embodiments of the invention include the use of multiple sensors and multiple-instance learning. As illustrated in FIG. 1, events can be represented as positive bags, and features extracted from a sensor associated with a manually annotated event are instances in a positive bag. Also, negative instances can be constructed automatically by considering time periods when no events are annotated.

Additionally, one or more embodiments of the invention, specify multiple ROIs (for example, overlapped ROIs) to cover all possible locations for events. ROIs can be any shape (for example, polygons are often used) and ROIs do not need to be the same size. The techniques described herein can also extract features (for example, color, edge, motion, etc.) from each ROI as well as select a learning technique (for example, Support Vector Machines (SVMs)) and build event models under multiple-instance learning contexts. Also, one or more embodiments of the invention perform event detection with the event models learned from MIL.

Also, one or more embodiments of the invention divide a transaction area into three parts: the lead-in belt area where a customer unloads the merchandise, the scan area where a scanner is installed, and the take-away area where scanned items are deposited. A complete process to transact one item at the POS is referred to herein as a visual scan. A visual scan can include three major operations from the cashier: picking up an item from the lead-in belt, reading the bar code on the item via the scanner (or weighing an item if it has no bar code) for registration and then placing the item onto the take-away belt for bagging. These three operations are referred to herein as pickup, scan and drop, respectively. These operations are the primary primitive events (or primitives), as described herein.

As noted above, a pickup (or drop) event can be considered as an interaction between the cashier's hand(s) and the lead-in (or take-away) area. However, this interaction is un-oriented, and can occur almost anywhere in the transaction area. This poses a problem for defining an appropriate ROI for the event model. While an ideal ROI should be large enough to cover all possible locations of the events to be detected, it likely includes many irrelevant features that result from the bagging person or the customer. As such, one or more embodiments of the invention apply the multiple-instance learning technique to build location-aware event models.

The techniques described herein use multiple overlapped ROIs to cover a transaction area as much as possible so that each event is guaranteed to be in an ROI. A motion-based segmentation algorithm is applied to identify segments as candidates for primitives in the video sequence of each ROI. As noted herein, however, a supervised learning paradigm is not suited for multiple ROIs because the correspondence between events and ROIs is unknown. As such, one or more embodiments of the invention use multiple-instance learning (MIL), which is effective in resolving problems where correspondences are missing.

MIL, as described herein, solves the problem of learning from incompletely labeled data. Unlike supervised learning, in which every training instance is associated with a label, MIL deals with data where labels (for example, binary, either 0 or 1) are assigned to bags of instances instead of an individual instance. A positive bag has at least one positive instance that is related to a concept of interest, while all instances in a negative bag are negative. The goal of MIL is to learn a model of the concept from the incompletely labeled data for classification of unseen bags or instances.

Learning event models from multiple ROIs is connected to MIL in that each event corresponds to at least one ROI, but the correspondence is not specified. For each annotated event, one or more embodiments of the invention create a positive bag, the instances of which are the features extracted from all the ROIs with regards to color, edge, motion information, etc. Negative bags can be generated in a similar way by considering those video segments with sufficient motion change but no primitives annotated in the ground truth.

Additionally, one or more embodiments of the invention use the SVM-based MIL techniques (MIL-SVM) to learn event models for pickup and drop. Scan events are more limited to a small region, so one or more embodiments of the invention use a single ROI for it.

Figure 2:
FIG. 2 is a diagram illustrating detecting cashier operations at a POS, according to an embodiment of the present invention.

FIG. 2 is a diagram illustrating detecting cashier operations at a POS 202, according to an embodiment of the present invention. As depicted in FIG. 2, cashier operations at a POS 202 can include picking up an item (pickup), placing an item onto the belt (drop) scanning an item (scan), etc. Cashier operations can also include un-oriented interactions between the hand and the belt, so it is advantageous to know where a pickup (or drop) occurs.

Figure 3:
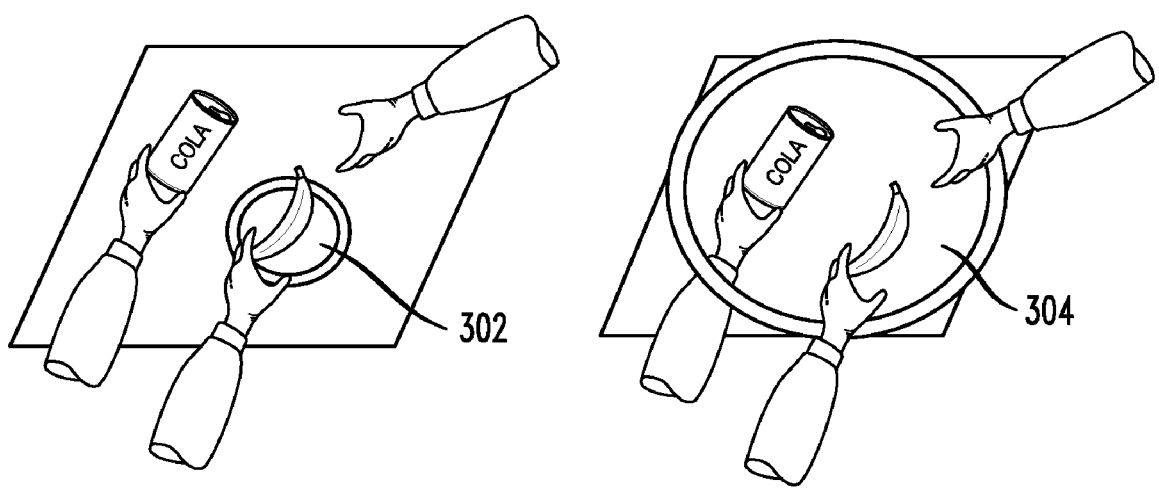
FIG. 3 is a diagram illustrating small and large ROIs, according to an embodiment of the present invention.

FIG. 3 is a diagram illustrating small and large ROIs, according to an embodiment of the present invention. By way of illustration, FIG. 3 depicts a small ROI 302 and a large ROI 304. As described herein, building event models requires specifying a ROI. However, if the ROI is too small, it may miss many items. And if the ROI is too large, it may include too much noise from bagging or customer intervention.

Figure 4:
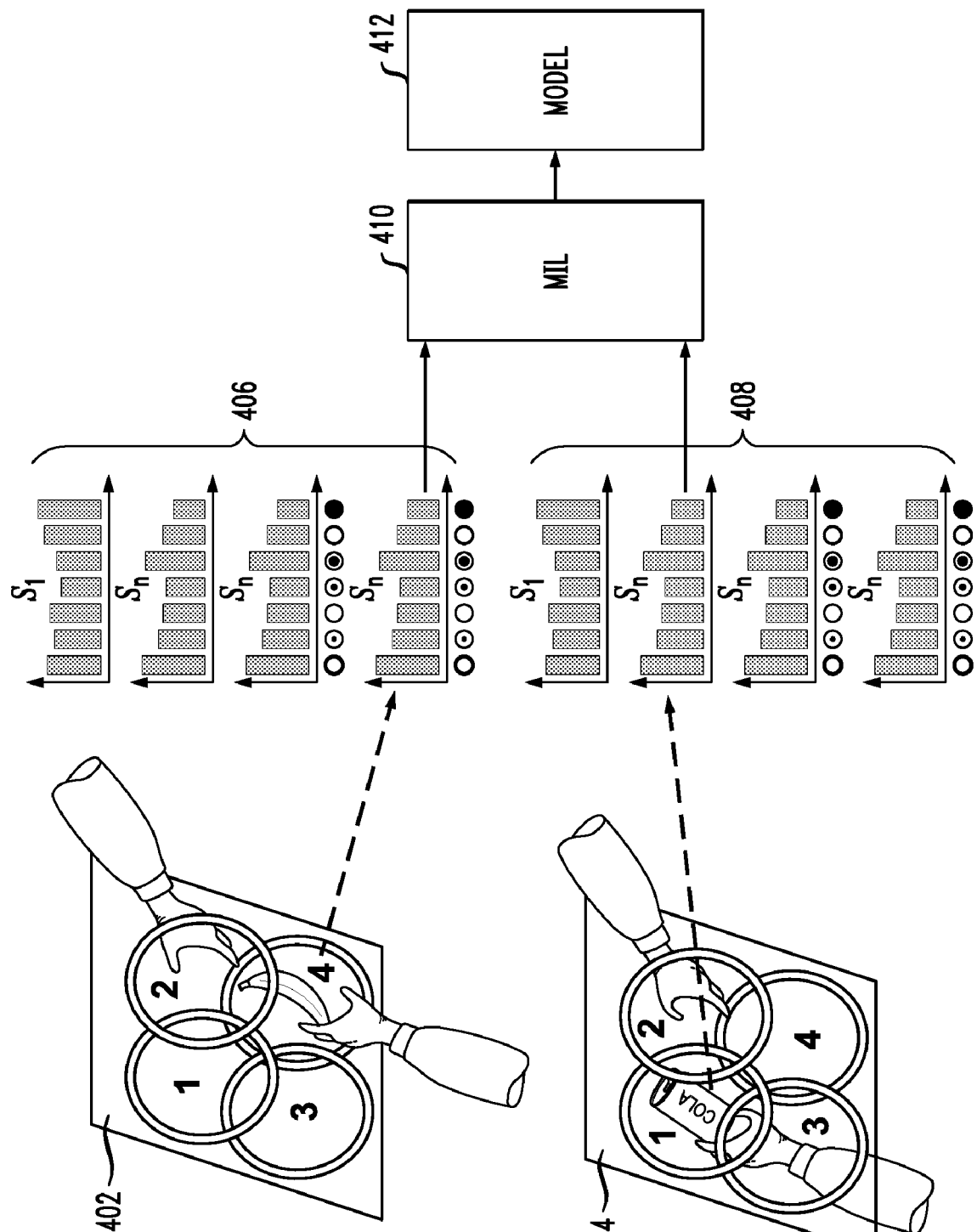
FIG. 4 is a diagram illustrating using multiple overlapped ROIs, according to an embodiment of the present invention.

FIG. 4 is a diagram illustrating using multiple overlapped ROIs, according to an embodiment of the present invention. By way of illustration, FIG. 4 depicts multiple overlapped ROIs 402 and 404. FIG. 4 also depicts bags of features (which are represented by histograms of visual words here) extracted from all the ROIs 406 and 408, a MIL component 410 and an event model 412.

As illustrated in FIG. 4, one or more embodiments of the invention use multiple overlapped ROIs, wherein each item is guaranteed to be in one ROI (that is, at least one ROI corresponds to an event), but the correspondence is missing. Additionally, the techniques described herein can apply MIL to resolve the correspondence problem (that is, identify the missing correspondence) and learn better event models.

Figure 5:
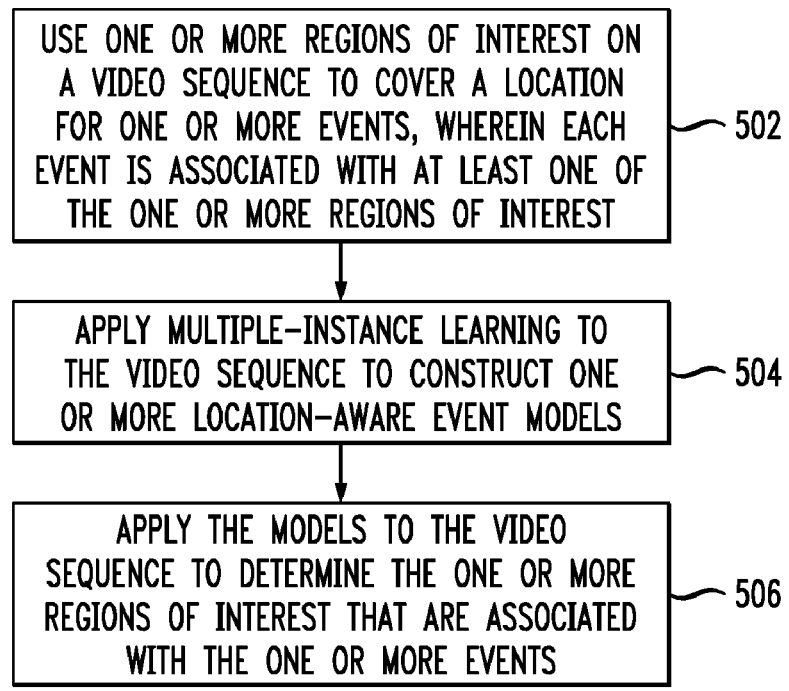
FIG. 5 is a flow diagram illustrating techniques for detecting one or more events, according to an embodiment of the present invention.

FIG. 5 is a flow diagram illustrating techniques for detecting one or more events, according to an embodiment of the present invention. The events can include events (for example, cashier activity) at a point of sale. For example, the events at a point of sale can include a pickup, a scan and a drop, wherein a pickup includes a cashier picking up an item, a scan includes a cashier at least one of reading the barcode of an item via a scanner and weighing an item, and a drop includes a cashier placing an item on the take-away belt.

Step 502 includes using one or more regions of interest on a video sequence to cover a location for one or more events, wherein each event is associated with at least one of the one or more regions of interest. Using regions of interest on a video sequence can include, for example, overlapping one or more regions of interest on a video sequence. Also, the regions of interest can be of one or more shapes as well as one or more sizes.

Step 504 includes applying multiple-instance learning to the video sequence to construct one or more location-aware event models. Step 506 includes applying the models to the video sequence to determine the one or more regions of interest that are associated with the one or more events.

The techniques depicted in FIG. 5 can also include using a support vector machine-(SVM)-based MIL technique to learn event models for a pickup and a drop. Additionally, one or more embodiments of the invention include extracting features (for example, color, edge, motion, etc.) from each region of interest.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 6:
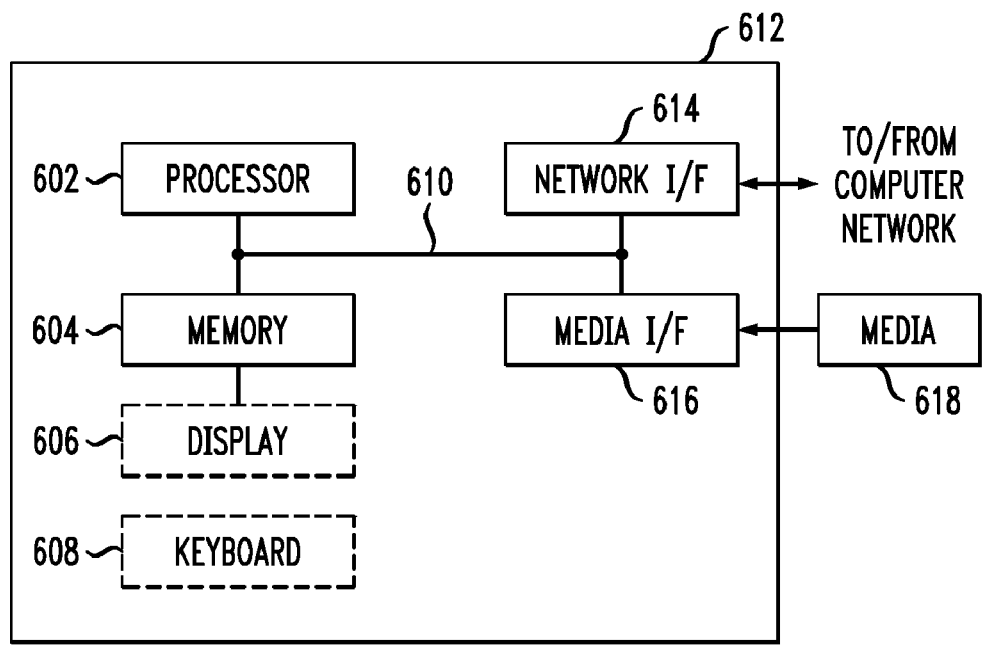
FIG. 6 is a system diagram of an exemplary computer system on which at least one embodiment of the present invention can be implemented.

At present, it is believed that the preferred implementation will make substantial use of software running on a general-purpose computer or workstation. With reference to FIG. 6, such an implementation might employ, for example, a processor 602, a memory 604, and an input and/or output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 602, memory 604, and input and/or output interface such as display 606 and keyboard 608 can be interconnected, for example, via bus 610 as part of a data processing unit 612.

Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 604), magnetic tape, a removable computer diskette (for example, media 618), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, using multiple ROIs or sensors to cover all possible locations for events such that each event can be associated with at least one sensor, and applying multiple-instance learning to select one or more appropriate sensors for building event detection models.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for detecting one or more events, comprising the steps of:
   using multiple overlapping regions of interest on a video sequence to cover a location for one or more events, wherein each event is associated with at least one of the multiple overlapping regions of interest;
   applying multiple-instance learning to the video sequence to select one or more of the multiple overlapping regions of interest to construct one or more location-aware event models;
   using a support vector machine- (SVM)-based multiple-instance learning technique to learn one or more event models for a pickup and a drop; and
   applying the models to the video sequence to detect the one or more events and to determine the one or more regions of interest that are associated with the one or more events.

2. The method of claim 1, wherein the one or more events comprise one or more events at a point of sale.

3. The method of claim 2, wherein the one or more events at a point of sale comprise a pickup, a scan and a drop, wherein a pickup comprises a cashier picking up an item, a scan comprises a cashier at least one of reading the barcode on an item via a scanner and weighing an item, and a drop comprises a cashier placing an item onto a take-away belt area.

4. The method of claim 1, wherein the multiple overlapping regions of interest comprise one or more shapes.

5. The method of claim 1, wherein the multiple overlapping regions of interest comprise one or more sizes.

6. The method of claim 1, further comprising extracting one or more features from each region of interest.

7. The method of claim 6, wherein the one or more features comprise at least one of color, edge and motion.

8. A computer program product comprising a tangible non-transitory computer readable recordable storage medium having computer readable program code for detecting one or more events, said computer program product including:
   computer readable program code for using multiple overlapping regions of interest on a video sequence to cover a location for one or more events, wherein each event is associated with at least one of the multiple overlapping regions of interest;
   computer readable program code for applying multiple-instance learning to the video sequence to select one or more of the multiple overlapping regions of interest to construct one or more location-aware event models;
   computer readable program code for using a support vector machine- (SVM)-based multiple-instance learning technique to learn one or more event models for a pickup and a drop; and
   computer readable program code for applying the models to the video sequence to detect the one or more events and to determine the one or more regions of interest that are associated with the one or more events.

9. The computer program product of claim 8, wherein the one or more events comprise one or more events at a point of sale.

10. The computer program product of claim 9, wherein the one or more events at a point of sale comprise a pickup, a scan and a drop, wherein a pickup comprises a cashier picking up an item, a scan comprises a cashier at least one of reading the barcode on an item via a scanner and weighing an item, and a drop comprises a cashier placing an item onto a take-away belt area.

11. The computer program product of claim 8, further comprising computer readable program code for extracting one or more features from each region of interest.

12. The computer program product of claim 11, wherein the one or more features comprise at least one of color, edge and motion.

13. The computer program product of claim 8, wherein the multiple overlapping regions of interest comprise one or more shapes and one or more sizes.

14. A system for detecting one or more events, comprising:
   a memory; and
   at least one processor coupled to said memory and operative to:
      use multiple overlapping regions of interest on a video sequence to cover a location for one or more events, wherein each event is associated with at least one of the multiple overlapping regions of interest;
      apply multiple-instance learning to the video sequence to select one or more of the multiple overlapping regions of interest to construct one or more location-aware event models;
      use a support vector machine-(SVM)-based multiple-instance learning technique to learn one or more event models for a pickup and a drop; and
      apply the models to the video sequence to detect the one or more events and to determine the one or more regions of interest that are associated with the one or more events.

15. The system of claim 14, wherein the one or more events comprise one or more events at a point of sale.

16. The system of claim 15, wherein the one or more events at a point of sale comprise a pickup, a scan and a drop, wherein a pickup comprises a cashier picking up an item, a scan comprises a cashier at least one of reading the barcode on an item via a scanner and weighing an item, and a drop comprises a cashier placing an item onto a take-away belt area.

17. The system of claim 14, wherein the at least one processor coupled to said memory is further operative to extract one or more features from each region of interest.

18. The system of claim 17, wherein the one or more features comprise at least one of color, edge and motion.

19. An apparatus for detecting one or more events, said apparatus comprising:
   means for using multiple overlapping regions of interest on a video sequence to cover a location for one or more events, wherein each event is associated with at least one of the multiple overlapping regions of interest;
   means for applying multiple-instance learning to the video sequence to select one or more of the multiple overlapping regions of interest to construct one or more location-aware event models;
   means for using a support vector machine-(SVM)-based multiple-instance learning technique to learn one or more event models for a pickup and a drop; and
   means for applying the models to the video sequence to detect the one or more events and to determine the one or more regions of interest that are associated with the one or more events.

* * * * *